(12) United States Patent
Lurie et al.

(10) Patent No.: US 10,696,486 B2
(45) Date of Patent: Jun. 30, 2020

(54) HYDRAULIC TENSIONING SYSTEM FOR CONVEYORS

(71) Applicant: THYSSENKRUPP INDUSTRIAL SOLUTIONS (USA), INC., Greenwood Village, CO (US)

(72) Inventors: Martin S. Lurie, Englewood, CO (US); Mark Alspaugh, Littleton, CO (US); Ruben E. Lezius, Greenwood Village, CO (US); Kalin Tonchev, Greenwood Village, CO (US); R. Steven Kasper, Parker, CO (US); Vladimir Svirsky, Aurora, CO (US)

(73) Assignee: THYSSENKRUPP INDUSTRIAL SOLUTIONS (USA), INC., Greenwood Village, CO (US)

( * ) Notice: Subject to any disclaimer, the term of this patent is extended or adjusted under 35 U.S.C. 154(b) by 0 days.

(21) Appl. No.: 16/472,595

(22) PCT Filed: Jan. 16, 2018

(86) PCT No.: PCT/US2018/013895
§ 371 (c)(1),
(2) Date: Jun. 21, 2019

(87) PCT Pub. No.: WO2018/132837
PCT Pub. Date: Jul. 19, 2018

(65) Prior Publication Data
US 2019/0322459 A1    Oct. 24, 2019

Related U.S. Application Data

(60) Provisional application No. 62/446,789, filed on Jan. 16, 2017.

(51) Int. Cl.
*B65G 23/44*   (2006.01)
*B65G 43/00*   (2006.01)

(52) U.S. Cl.
CPC ............. *B65G 23/44* (2013.01); *B65G 43/00* (2013.01)

(58) Field of Classification Search
CPC ............................... B65G 23/44; B65G 43/00
(Continued)

(56) References Cited

U.S. PATENT DOCUMENTS 3,777,879 A * 12/1973 Dehne .................... B65G 23/44
                                                   198/810.04
3,918,894 A    11/1975 Stanke
(Continued)

FOREIGN PATENT DOCUMENTS

CN      201694599 U    1/2011
DE         3231961 A1 *  5/1983 ............. B65G 23/44
(Continued)

OTHER PUBLICATIONS

International Search Report issued in PCT/US2018/013895, dated Apr. 13, 2018.

*Primary Examiner* — Mark A Deuble
(74) *Attorney, Agent, or Firm* — thyssenkrupp North America, LLC

(57) ABSTRACT

A tensioning system maintains tension within a target range for an endless belt of a conveyor. The tensioning system may include a movable carriage that supports a take-up pulley that provides tension to the conveyor belt. The tensioning system may also include various hydraulic components supported on a repositionable cart. One example hydraulic component is a hydraulic cylinder that is in tension between the movable carriage and the repositionable cart. An accumulator initially pressurized to a predetermined pressure may be connected so as to supply pressure to the hydraulic cylinder. One or more flow-restriction valves between the hydraulic cylinder and the accumulator may substantially increase a pressure in the hydraulic cylinder during phases
(Continued)

when a piston rod is rapidly drawn out of the hydraulic cylinder by tension waves in the endless belt. Further, a check valve may permit substantially unimpeded fluid flow from the accumulator to the hydraulic tensioning cylinder.

20 Claims, 14 Drawing Sheets

(58) Field of Classification Search
USPC .......................................................... 198/813
See application file for complete search history.

(56) References Cited

U.S. PATENT DOCUMENTS

| | | | |
|---|---|---|---|
| 4,007,826 A | 2/1977 | Brown, Jr. | |
| 5,131,528 A * | 7/1992 | Bandy, Jr. | B65G 23/44 198/813 |
| 5,899,321 A * | 5/1999 | El-Ibiary | B65G 39/16 198/807 |
| 6,695,130 B1 * | 2/2004 | Blaylock | B65G 23/44 198/813 |
| 2010/0270131 A1 * | 10/2010 | Vasey | B65G 21/14 198/812 |
| 2013/0277178 A1 * | 10/2013 | Strieker | B65G 15/60 198/813 |
| 2014/0124336 A1 * | 5/2014 | Domenicucci | B65G 43/02 198/810.02 |
| 2014/0330430 A1 * | 11/2014 | Waller | B65G 23/44 700/230 |
| 2015/0321856 A1 | 11/2015 | De Goede | |
| 2017/0101270 A1 * | 4/2017 | de Lore | B65G 23/44 |
| 2019/0092576 A1 * | 3/2019 | Rempel | B65G 23/44 |

FOREIGN PATENT DOCUMENTS

| | | |
|---|---|---|
| DE | 3811393 A | 10/1989 |
| DE | 19756328 A | 7/1999 |

* cited by examiner

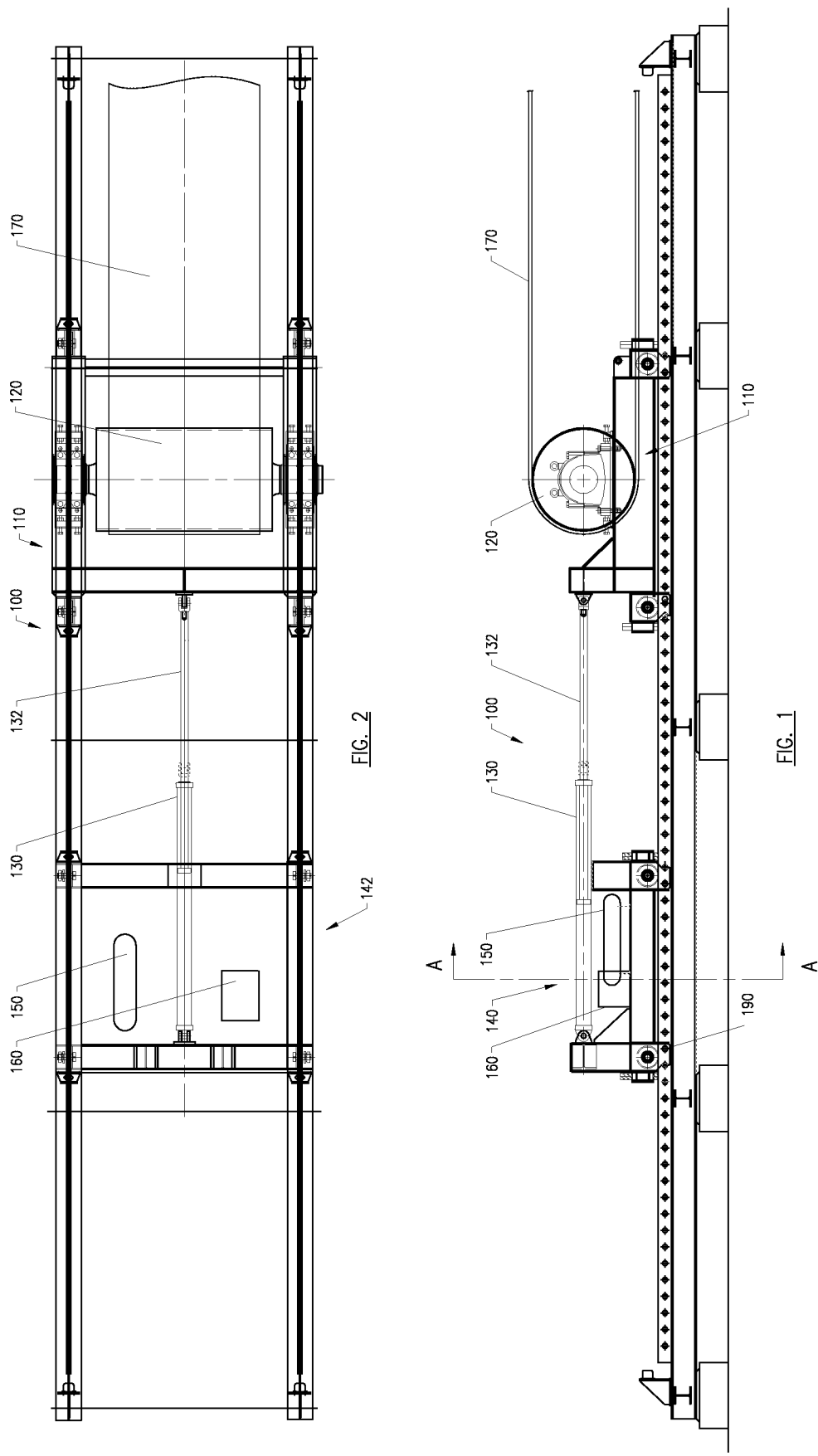

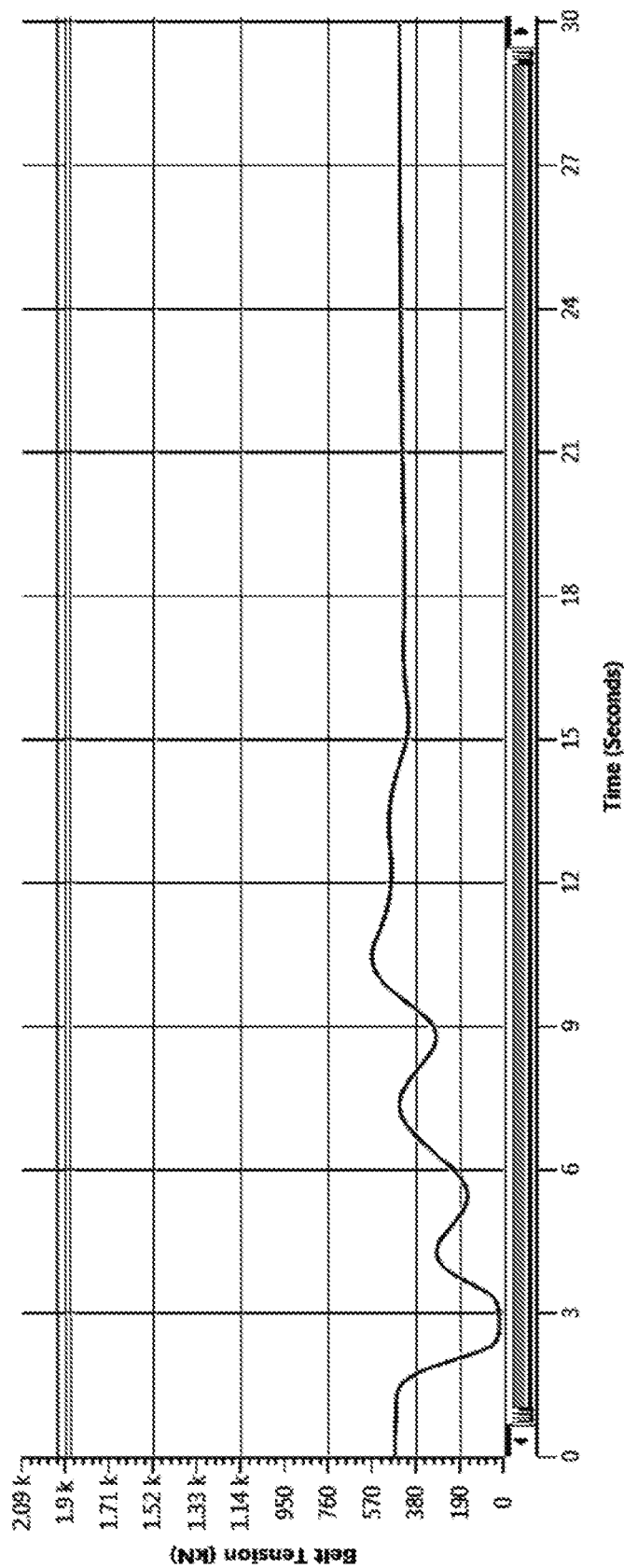
Fig. 5A – PRIOR ART

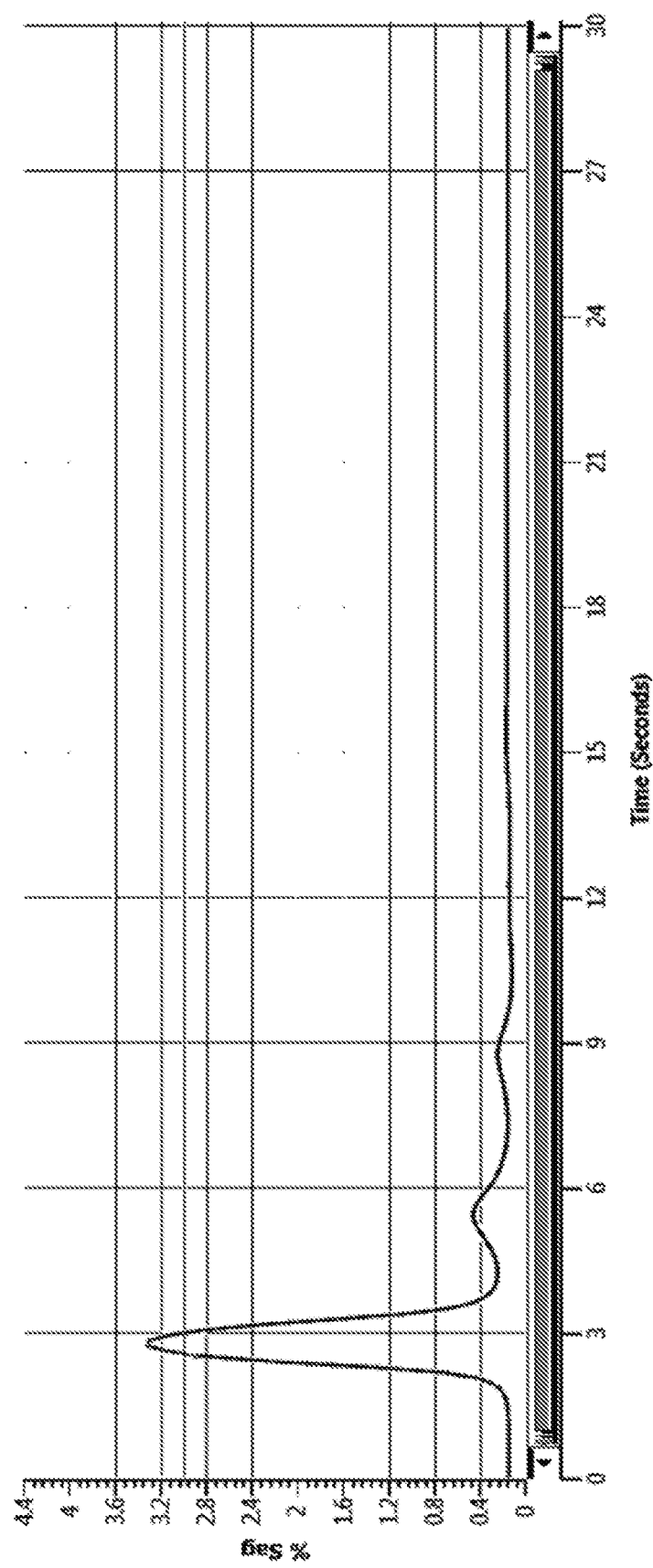
Fig. 5B – PRIOR ART

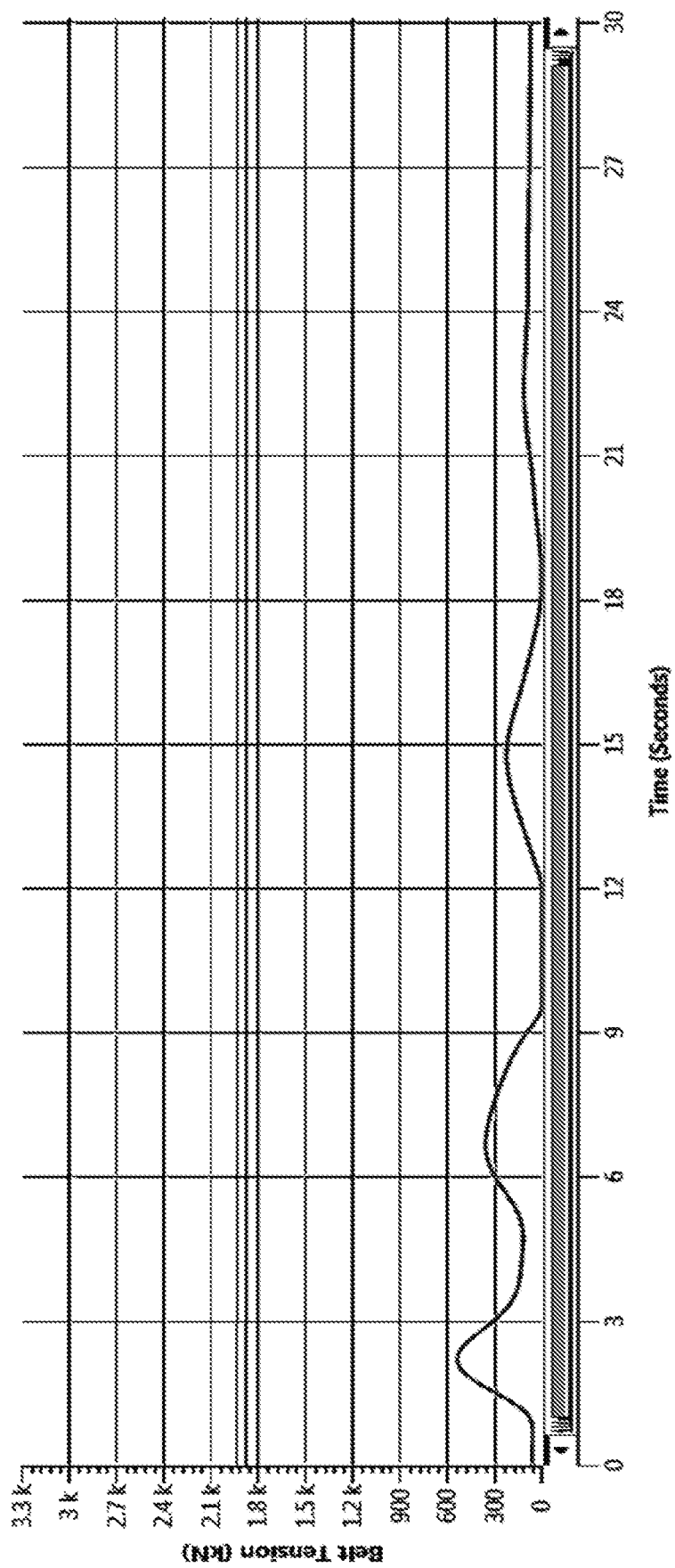
Fig. 5C – PRIOR ART

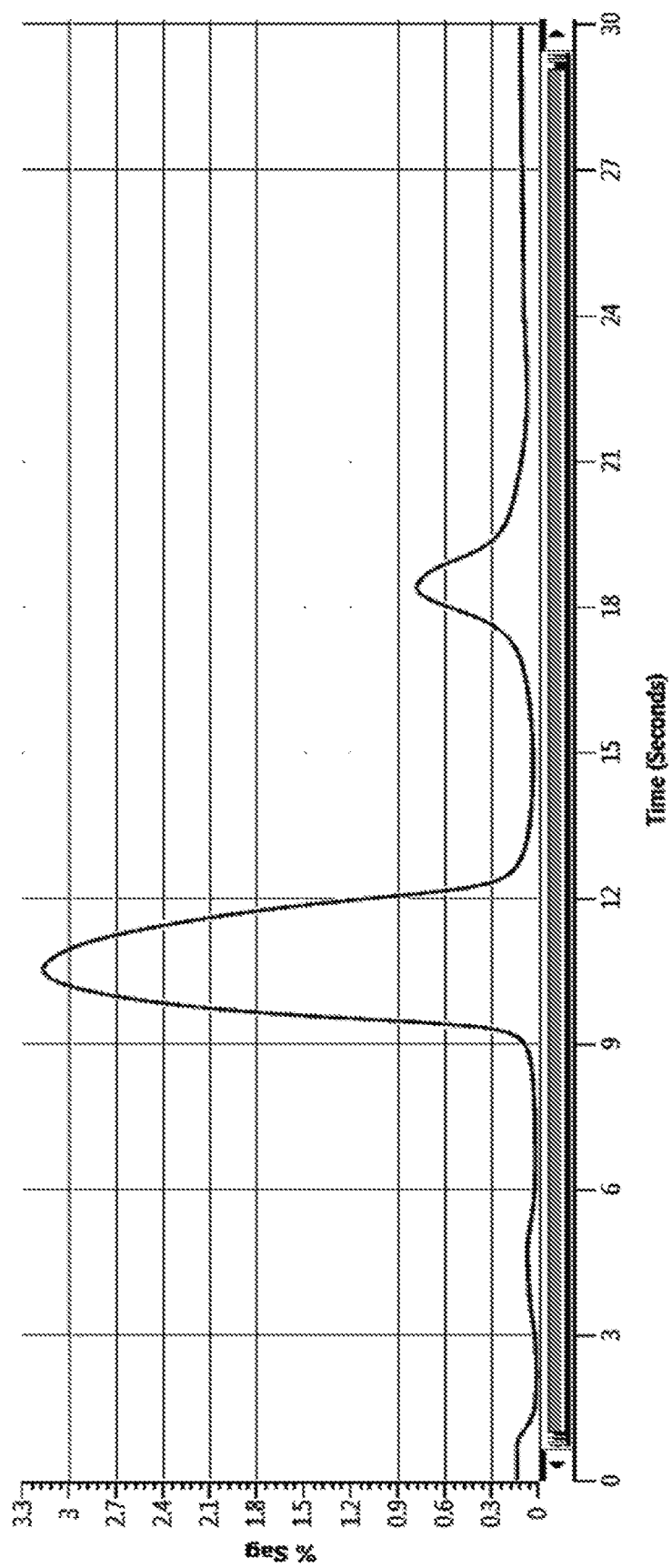
Fig. 5D – PRIOR ART

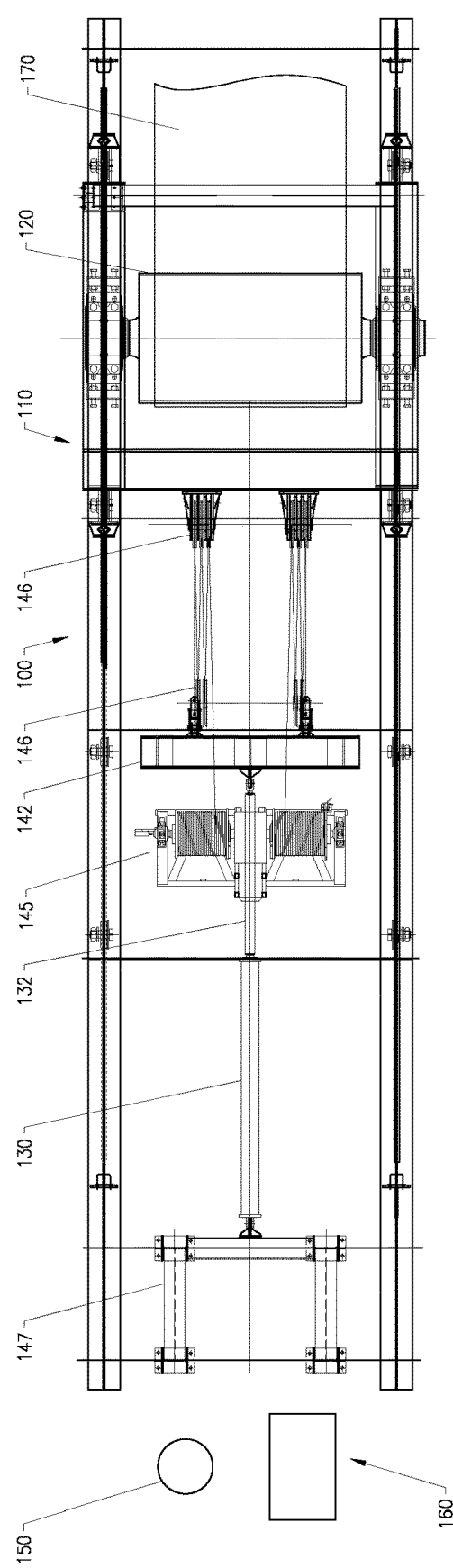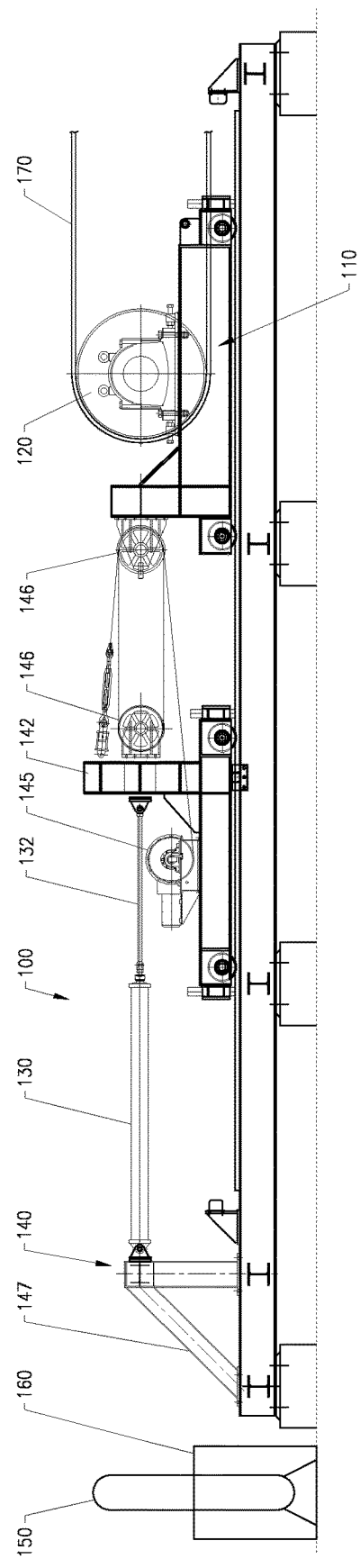
FIG. 6B
FIG. 6A

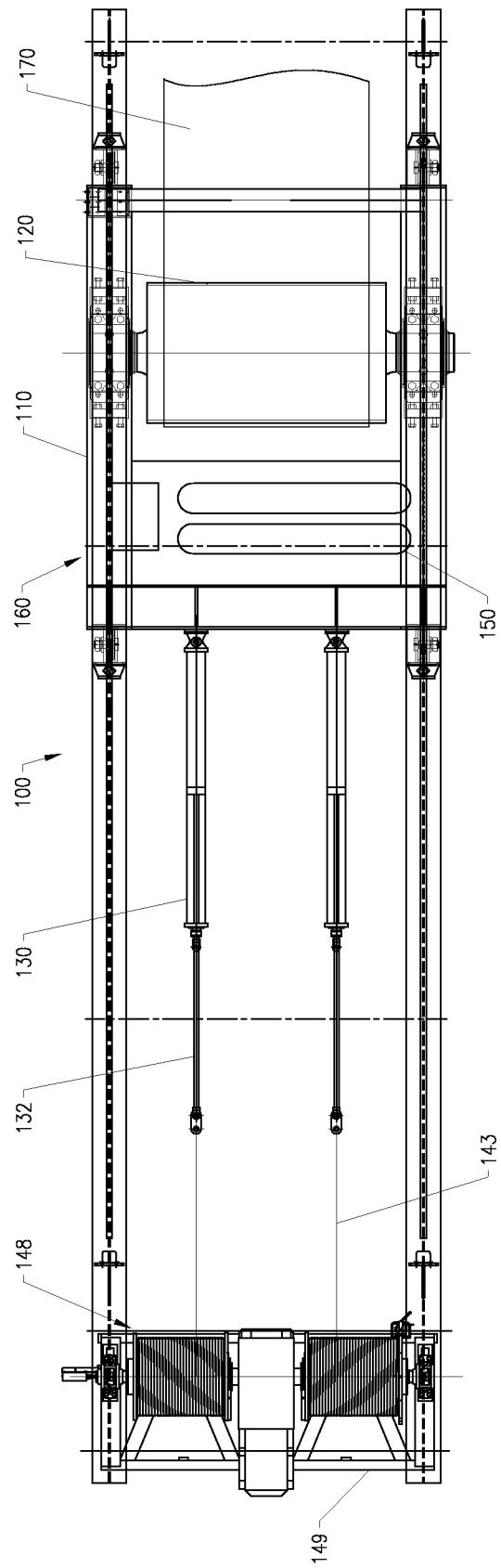

HYDRAULIC TENSIONING SYSTEM FOR CONVEYORS

CROSS REFERENCE TO RELATED APPLICATION

This application is a U.S. national stage entry of International Patent Application No. PCT/US2018/013895 filed Jan. 16, 2018, which is an International Application claiming priority to U.S. Provisional Application No. 62/446,789 filed Jan. 16, 2017, which is entitled "Hydraulic Tensioning System for Conveyors," the entire contents of both of which are incorporated herein by reference.

FIELD OF THE DISCLOSURE

The present disclosure generally relates to conveyors, including hydraulic tensioning systems for conveyors.

BACKGROUND

In belt conveyor systems incorporating endless belts, tensioning devices of various kinds may be used to ensure that belt tension is always maintained within a target range along the belt path. In some cases, it may be desirable for the tensioning device (or "take-up device") to continue maintaining belt tension within a target range, even after there has been a failure of the power supply to the conveyor drives and auxiliary equipment. In such cases, a tensioning or take-up device that includes some type of energy-storage means may satisfy the need.

Gravity-type take-up arrangements are the most common type of energy-storage system for conveyor take-ups. These types of energy storage systems often fall short of needs because they require significant space and are limited in their ability to modulate the tension response during transient tension waves that may arise after a sudden loss of power.

Some energy-storage systems are known, including those that use hydraulic accumulators to change the tension applied to a movable carriage (or a "take-up carriage") after a power outage. For example, U.S. Pat. No. 4,007,826 describes a system where a conveyor take-up is tensioned for normal running by the pressure from a first (lower-pressure) hydraulic accumulator. During transient events that would otherwise result in localized excessive belt sag, the pressurization of the hydraulic take-up cylinder is switched to a second (higher-pressure) accumulator. The energy stored in the higher-pressure accumulator is then used to impose increased tension at the tail of the conveyor to avoid excessive sag arising during the rapid deceleration of the system. These types of systems are limited in that switching from the lower-pressure accumulator to the higher-pressure accumulator uses a powered switching circuit that requires power and/or power backup independent of the conveyor power system. The dual-pressure arrangement also adds complexity to the tensioning system.

Other tension management systems include "fully-active" or "semi-active" electric take-up winches that are increasingly used for high-power conveyors. These systems are limited in that "fully-active" or "semi-active" electric take-up winches cannot be called upon to actively change the tension applied to the take-up carriage during those dynamic events that follow a power outage, because power is also not available to drive the winch motor. Systems able to store sufficient electrical power to drive such winches for a short time immediately after a power outage would be costly and have not been available in the market.

There is thus a need for tensioning devices that will provide desirable behavior under both normal operating and "upset" conditions. In particular, during normal operation a tensioner should draw out the tensioning pulley with sufficient force and displacement such that when the conveyor belt is under full load, the tension provided by the tensioner remains at least in the target range. Likewise, when the conveyor belt is unloaded and contracted to a maximum degree, the tensioner should allow sufficient movement of the tensioning pulley so as to prevent excessive belt tensions. Further, during upset conditions (or "transient conditions") following a loss of power, the tensioner should firstly provide for development of an increased level of tension that is nevertheless controlled within limits. Later during the transient conditions, the tensioner should be able to maintain a minimum level of tension by moving the tensioning pulley at sufficient speed and with enough force to absorb sag that might otherwise develop at some locations in the belt loop. Furthermore, the tensioning device should permit temporary application of higher static tensions to avoid slip when one of a conveyor's drive pulleys is out of order. The various examples of the present disclosure set forth below satisfy these needs.

BRIEF DESCRIPTION OF THE DRAWINGS

The foregoing and other features of the present disclosure will become more fully apparent from the following description and appended claims, taken in conjunction with the accompanying drawings. Understanding that these drawings depict examples in accordance with the disclosure and are, therefore, not limiting of its scope, the disclosure will be described with additional specificity and detail through use of the accompanying drawings.

FIG. 1 is a side schematic view of an example take-up system for a belt conveyor.

FIG. 2 is a top schematic view of the example take-up system of FIG. 1 for the belt conveyor.

FIG. 5A is a graph showing belt tension versus time for a prior art gravity take-up device used to tension a tail pulley of a slope conveyor.

FIG. 5B is a graph showing belt percentage sag versus time for a prior art gravity take-up device used to tension a tail pulley of a slope conveyor.

FIG. 5C is a graph showing belt tension versus time for a prior art electric winch take-up device used to tension a tail pulley of a slope conveyor.

FIG. 5D is a graph showing belt sag versus time for a prior art electric winch take-up device used to tension a tail pulley of a slope conveyor.

FIG. 6A is a side schematic view of another example take-up system for a belt conveyor, including an example trim winch assembly mounted on an example non-anchored cart.

FIG. 6B is a top schematic view of the example take-up system shown in FIG. 6A.

FIG. 8 is a side schematic view of another example take-up system for a belt conveyor, wherein hydraulic components are mounted on an example movable carriage, and an example trim winch is anchored to structure outboard of the hydraulic components and the movable carriage.

FIG. 9 is a top schematic view of the example take-up system for a belt conveyor shown in FIG. 8.

DETAILED DESCRIPTION

Figure 3A:
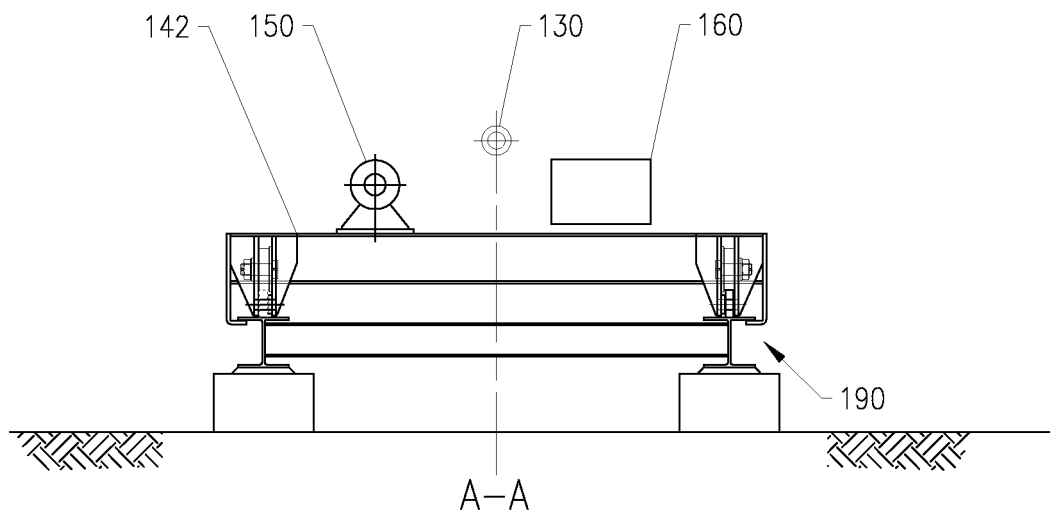
FIG. 3A is a cross-sectional schematic view taken across line A-A in FIG. 1 of the example take-up system for the belt conveyor.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein and as illustrated in the figures, can be arranged, substituted, combined, separated, and designed in a wide variety of different configurations, all of which are implicitly contemplated herein.

In the field of conveying with endless-belt conveyors, under certain transient conditions elastic tension waves may travel along a length of a conveyor belt. These dynamic disturbances in the tension equilibrium can cause significant operational problems or damage, such as excessive sag or over-tension. One class of adverse dynamic behavior may arise when the conveyor drives have insufficient rotational inertia to gradually reduce tension on a carry side of the belt after the motor torque applied through the drive pulleys suddenly diminishes, such as when the motors lose power, for example. This may result in tension disturbances that bring excessively high tensions to a return run of the belt and excessive sag to a carry side of the run. Such tension disturbances may be particularly troublesome where the conveyor is an uphill slope conveyor whose drives do not have sufficient rotational inertia to minimize such tension disturbances. Conveyors driven by direct-drive synchronous motors do not have the benefit of rotor inertia referred (and therefore highly multiplied) through a conventional reducer. Therefore, improved solutions are desired that will both maintain target tensions in such conveyors during normal operation, and manage dynamic behavior after a power loss.

The present disclosure is drawn, inter alia, to methods, systems, products, devices, and/or apparatuses generally related to hydraulic tensioning systems for conveyors. More particularly, a take-up arrangement for a conveyor system may govern tension re-distribution during a transient event in such a way as to prevent excessively low or high tensions developing in the vicinity of the take-up or elsewhere in the conveyor. In various examples, large changes in tension may be responded to without the need for a substantial back-up power supply. In various examples, the tension may be responded to utilizing one or more accumulators pressurized to the same pressure, but without switching between different pressure sources provided by different accumulators having substantially different pressures.

As illustrated in FIGS. 1-3A and in accordance with various examples, one example take-up system 100 (or a "tensioning system") may include a movable carriage 110 supporting a take-up pulley 120 (or a "tensioning pulley"), a hydraulic cylinder 130 acting in tension on the movable carriage 110, a mounting frame 140 to support the hydraulic cylinder 130, an accumulator 150 initially pressurized to a predetermined pressure and connected so as to supply pressure to the hydraulic cylinder 130, and a flow-restriction circuit 160. The flow-restriction circuit 160 may be arranged to substantially increase the pressure in the hydraulic cylinder 130 during phases when a piston rod 132 is being rapidly drawn out of the cylinder 130 by tension waves originating in a conveyor belt 170, which in many cases is an endless belt. Further, those having ordinary skill in the art will readily understand that in other examples the take-up system 100 may include more than one of the aforementioned components, such as multiple interconnected accumulators 150 or multiple hydraulic cylinders 130, for instance. In some examples, it should be understood that the accumulator 150 may be a gas-energized hydraulic accumulator that uses gas as an elastic element that provides pressure to one or more hydraulic circuits.

In various examples, the mounting frame 140 may be a cart 142 that is semi-fixed and can be selectively repositioned as necessary. In other examples, however, the mounting frame 140 may be a structure separate from the cart 142. In some cases, the cart 142 may support certain hydraulic components such as the hydraulic cylinder 130, for example and without limitation.

Figure 4:
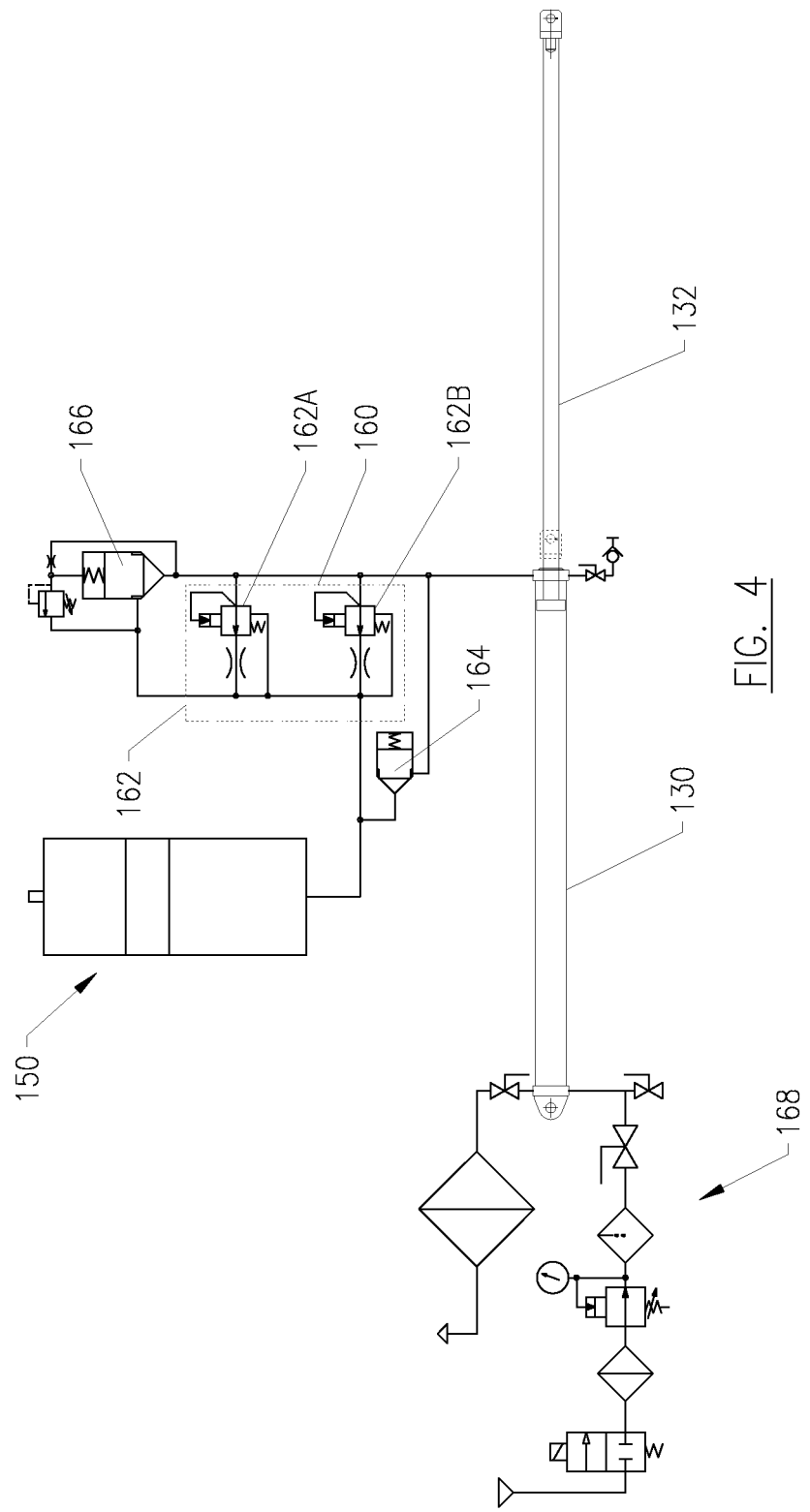
FIG. 4 is a schematic view of an example hydraulic circuit including an example accumulator and an example hydraulic cylinder for tensioning.

As illustrated in the example shown in FIG. 4, the accumulator 150 may provide pressure to hydraulic fluid in order to support the tension developed in the hydraulic cylinder 130. The tension carried through the piston rod 132 may then in turn be applied directly or indirectly to the take-up pulley 120. During normal operation of the conveyor, the take-up pulley 120 moves as the conveyor belt 170 effective length changes in response to the tension distribution along the belt loop.

As also shown in FIG. 4, the flow restriction circuit 160 may in some examples include one or more flow restrictors 162, such as one or more valves 162A and 162B, for example, arranged to act on fluid that is flowing at relatively high flowrates out of the hydraulic cylinder 130 and into the accumulator 150. This flow restriction circuit 160 may be configured to increase the transient pressure in the cylinder 130 to a level that may be many times higher than the quasi-static pressure supplied by the accumulator 150. In one example, the flow restrictors 162 of the flow restriction circuit 160 are suitable to limit the flow back to the accumulator 150 from the cylinder 130. In one example, the flow restrictors 162 are flow control valves.

In some examples, when the piston rod 132 is withdrawn from the hydraulic cylinder 130, the flow restrictors 162 may increase the pressure in the hydraulic cylinder 130 by a factor of between two and ten times the quasi-static pressure.

During a phase of operation of the take-up system 100 that pulls the piston rod 132 inwards to the cylinder 130, flow returning from the accumulator 150 to the hydraulic cylinder 130 is conducted along a path that does not impose significant flow restriction. This in turn allows the piston rod 132 to be drawn into the cylinder 130 at speeds that are high enough to maintain tension on the take-up pulley 120 and draw out slack belt that might otherwise develop along the length of the conveyor. In one example, a path from the accumulator 150 to the hydraulic cylinder 130 may include a check valve 164 that allows flow along this path to travel only from the accumulator 150 to the hydraulic cylinder 130. To travel from the hydraulic cylinder 130 back to the accumulator, the flow must pass through the one or more flow restrictors 162. In most examples, the flow restrictors 162 will be configured such that significant flow restriction is only imposed at the high flowrates arising during a transient event after a power loss at the drives. In some examples, the flow restrictors 162 may be pressure-compensated flow-control valves. In other examples, one or more flow-restriction orifices may be used to provide the desired back-pressure at high flowrates.

Furthermore, in some examples the flow restriction circuit 160 may include at least one pressure-relief valve 166 configured to regulate the pressure developed in the hydraulic cylinder 130. The flow restriction circuit 160 may further include additional pressure-relief valves pre-set for providing step-wise pressure relief on a cylinder-side of the flow restriction circuit 160.

In some examples, the hydraulic cylinder 130 may also include a trim circuit 168. The trim circuit 168 can add or remove fluid from a side of the hydraulic cylinder 130 opposite the side pressurized by the accumulator 150. This trimming-fluid volume may assist in changing the position of the piston rod 132, allowing for maintenance activities such as trimming or splicing the conveyor belt 170.

In accordance with various examples of the present disclosure and as disclosed above, various hydraulics components such as, for example, the hydraulic cylinder 130, the accumulator 150, and the flow-restriction valve circuit 160 may be supported by the cart 142 that is re-positioned from time to time for various reasons, such as maintenance adjustments, for instance. Such adjustments may be to accommodate the initial stretch of the conveyor belt 170, or else to allow for the change in belt length occasioned by splicing. In some cases, the cart relocation may be facilitated by pneumatic or hydraulic pressure applied to one end of the cylinder or another.

Figure 3B:
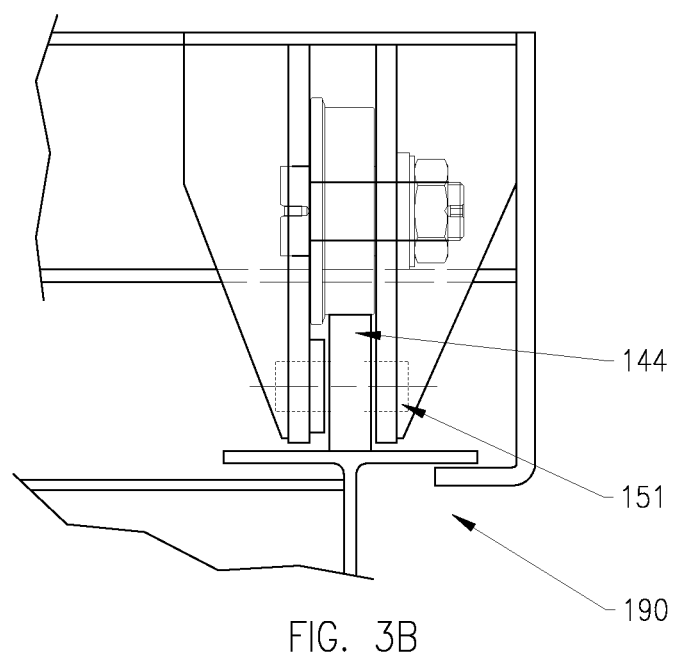
FIG. 3B is a detailed sectional schematic view of an example anchoring device on an example cart.

Moreover, the repositioning via trimming of the cart 142 may be enabled by temporary anchoring devices, such as the example temporary anchoring device 190 shown in FIG. 3B, for example. Generally, the temporary anchoring devices 190 are operable to apply a force to keep the cart 142 stable during trimming. However, during normal operation the cart 142 is located in place via a fixed attachment to a rail 144 that employs a permanent attachment mechanism such as pins 151, for example.

Figure 10:
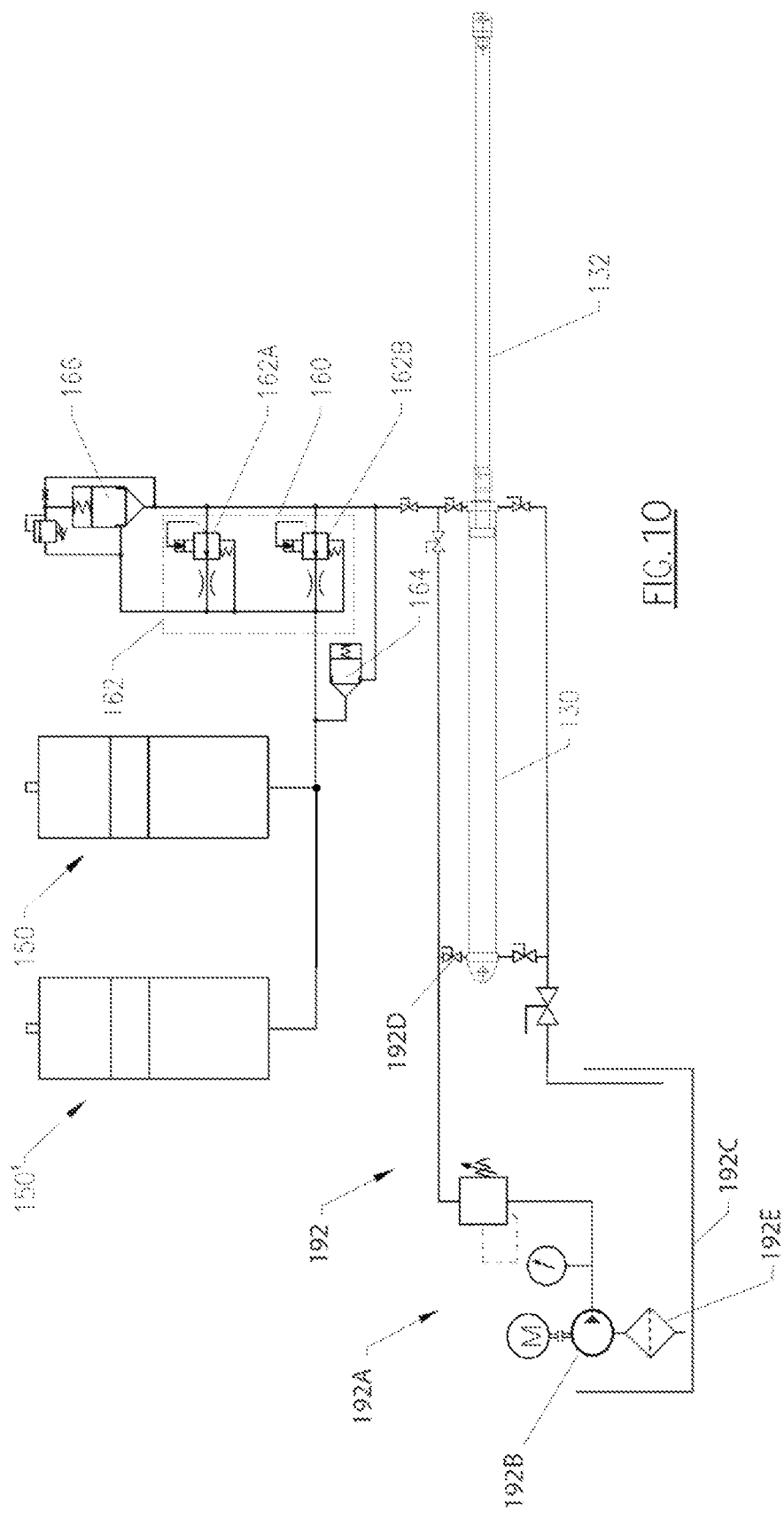
FIG. 10 is a schematic view of an example hydraulic circuit that includes an example accumulator and an example auxiliary hydraulic pressurizing circuit.

In some examples, such as that shown in FIG. 10, the take-up system 100 may also include an auxiliary hydraulic pressurizing circuit 192. Such an auxiliary hydraulic pressurizing circuit 192 may be used for initial pressurization of the take-up system 100 as well as periodic trim and maintenance adjustments. Furthermore, such an auxiliary hydraulic pressurizing circuit 192 may be used on occasion to temporarily pressurize the hydraulic cylinder 130 to a much higher pressure than normal, in order to increase drive pulley traction capacity when one or more of the conveyor's drive pulleys is out of service. Such an auxiliary hydraulic pressurizing circuit 192 may include, for instance, a hydraulic "power pack" 192A comprising a small hydraulic pump 192B, reservoir 192C, valves 192D, filters 192E, controls, and related devices. FIG. 10 also depicts how an example take-up system 100 may include multiple interconnected accumulators 150, 150', as disclosed above.

The graphs in FIGS. 5A-5G depict transient behavior in an example of a long slope conveyor that includes drives located at a head to carry material uphill. For conveyors of this type, take-up devices are typically located at a tail, or lowest point, of the conveyors. The figures illustrate tension behavior with various types of take-up devices, for a period in which the conveyor is coming to a stop after a loss of drive power. The characteristics of these graphs are discussed below.

FIG. 5A is a graph showing belt tension versus time for a prior art gravity take-up device used to tension a tail pulley of a slope conveyor. The graph of FIG. 5A illustrates the change of belt tension with time for a belt location about one-quarter of the conveyor length from the tail pulley of the conveyor. The graph shows a transient low-tension phase corresponding to an x-axis value of about three seconds, which represents a time three seconds after loss of power to the drive pulleys at the head of the conveyor. This low-tension transient arises because the gravity take-up is too compliant. Because the gravity take-up allows rapid movement of the tensioning pulley when a high-tension wave arrives there via the return belt, sufficient belt tension does not develop at the tail or further up a carry side. While the tension graph of FIG. 5A does not illustrate the effect of this low-tension transient, the effect is quantified in the graph of FIG. 5B.

FIG. 5B is a graph showing belt percentage sag versus time for a prior art gravity take-up device used to tension the tail pulley of the same slope conveyor. The peak sag of about 3.2% occurs at about three seconds after loss of power, and at a belt location about one-quarter of the conveyor length from the tail pulley of the conveyor. For some circumstances and conveyor operators, even a transient sag of above two or three percent is considered unacceptably high. Therefore, if a gravity take-up were to be used for this conveyor, the normal operating belt tension applied by the gravity take-up would have to be increased quite substantially. This increase in base tension would increase the operating stresses on the conveyor belt, which would typically increase the required rated tensile capacity of the conveyor belt.

FIG. 5C is a graph of belt tension versus time for a prior art electric winch take-up device used to tension the tail pulley of the same slope conveyor. Prior art electric take-up winches are typically configured so that self-applying brakes hold a winch drum immovably once there is a loss of power to a conveyor drive or to the winch itself. FIG. 5C illustrates the change of belt tension with time for a carry-side belt in close proximity to the tail pulley of the conveyor. Because the winch prevents a movable carriage from moving, the tension at the take-up pulley rises to a peak almost ten times greater than the nominal working tension of the winch. So in some cases, the winch brakes may be configured to allow some slip in order to mitigate the peak loads that arise. It can further be seen from FIG. 5C that the belt tension drops to low levels at a time about nine to twelve seconds after the power loss. The effect of this low-tension transient is quantified in percentage belt sag in FIG. 5D.

FIG. 5D is a graph showing percentage belt sag versus time for a prior art electric winch take-up device used to tension the tail pulley of the same slope conveyor modeled in FIGS. 5A-5C. A peak in belt sag occurs at about ten to eleven seconds after loss of power to the conveyor drives. This belt sag peak is in excess of three percent sag and arises later in a cycle when a carry-side of the conveyor belt rolls back downhill. Because the electric winch is no longer active after the power loss, the electric winch does not have the ability to draw excess belt out of the system and prevent this localized sag.

Figure 5E:
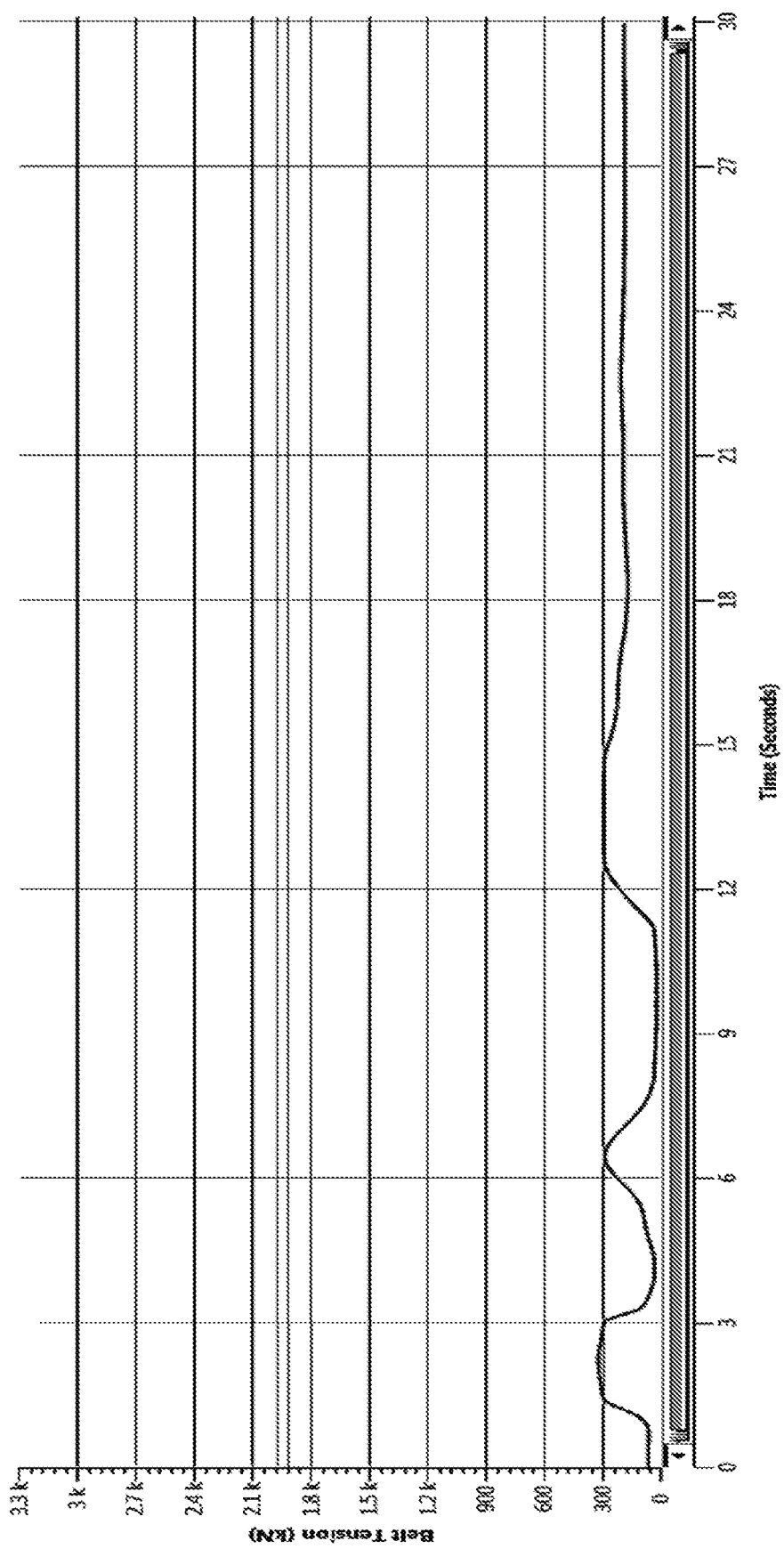
FIG. 5E is an example graph showing belt tension versus time for an example take-up device of the present disclosure that is used to tension a tail pulley of the same slope conveyor modeled in FIGS. 5A-5D.

Conversely, FIG. 5E is an example graph showing belt tension versus time for an example take-up system of the present disclosure used to tension the tail pulley of the same slope conveyor modeled in FIGS. 5A to 5D. The data for FIG. 5E comes from a location on a carry side of the conveyor near the tail pulley. Notably, a first tension peak arising before the 3-second mark is attenuated to nearly half of the belt tension exhibited in the case of the electric winch held by a power-loss brake, as illustrated in FIG. 5C. Moreover, low-tension portions of the graph in FIG. 5E do not reach the same low levels of tension found with the prior art examples discussed above, although this point is illustrated more clearly in FIG. 5F.

Figure 5F:
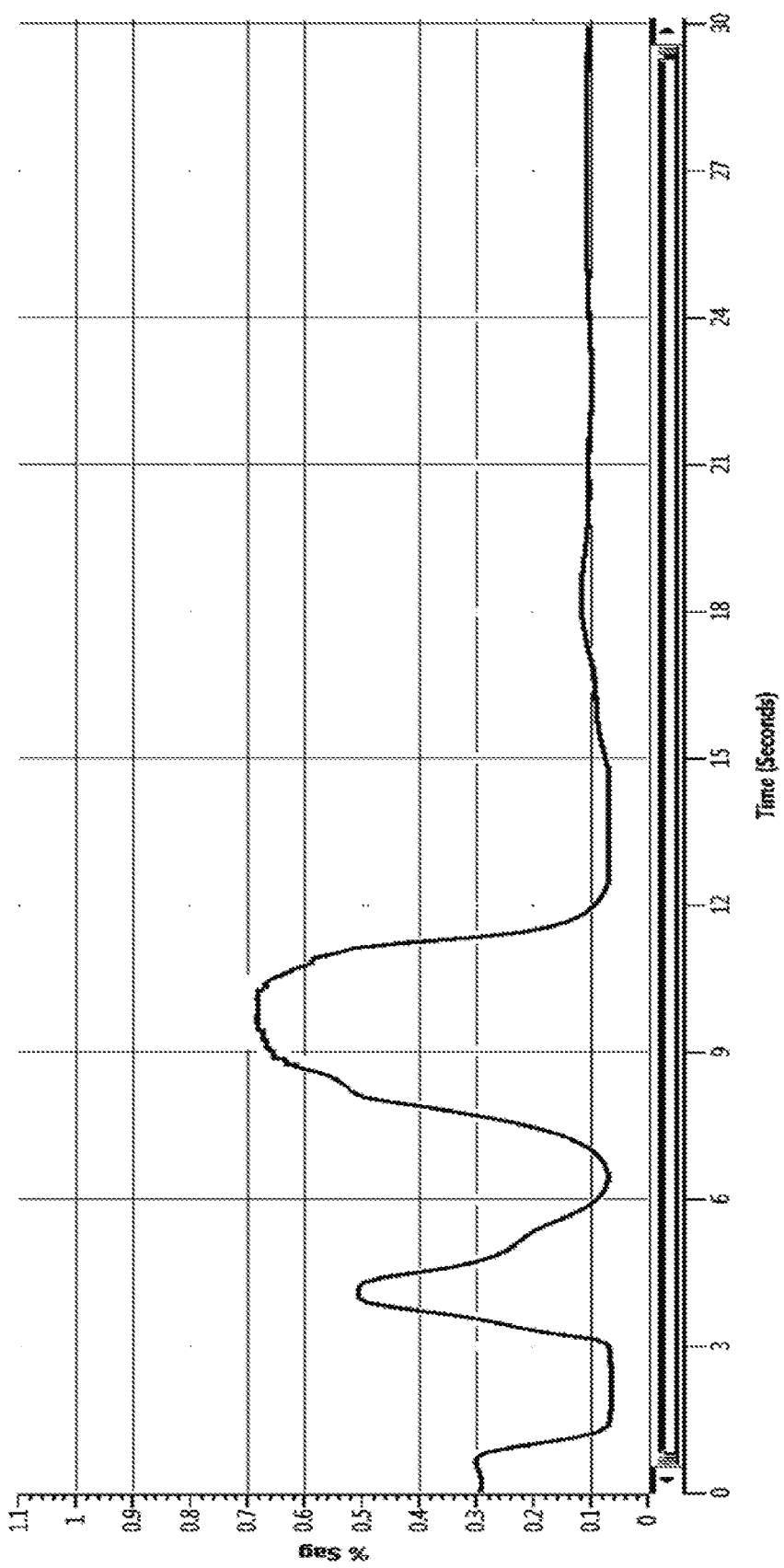
FIG. 5F is an example graph showing belt sag versus time for an example take-up device of the present disclosure that is used to tension a tail pulley of the same slope conveyor modeled in FIGS. 5A-5D.

FIG. 5F is an example graph showing the characteristics of belt percentage sag versus time for an example take-up system of the present disclosure used to tension the tail pulley of the same slope conveyor modeled in FIGS. 5A to 5D. As with FIG. 5E, the data for FIG. 5F comes from a location on a carry side of the conveyor near the tail pulley. FIG. 5F reflects increased sag peaks corresponding to the low-tension portions shown in FIG. 5E, but the magnitudes of these sag peaks are all below about 0.7% sag. This degree of sag is very well within allowable sag limits for most bulk-material belt conveyors, and much less than the sag in excess of three percent manifested with the prior art take-up systems illustrated in FIGS. 5A to 5D.

Figure 5G:
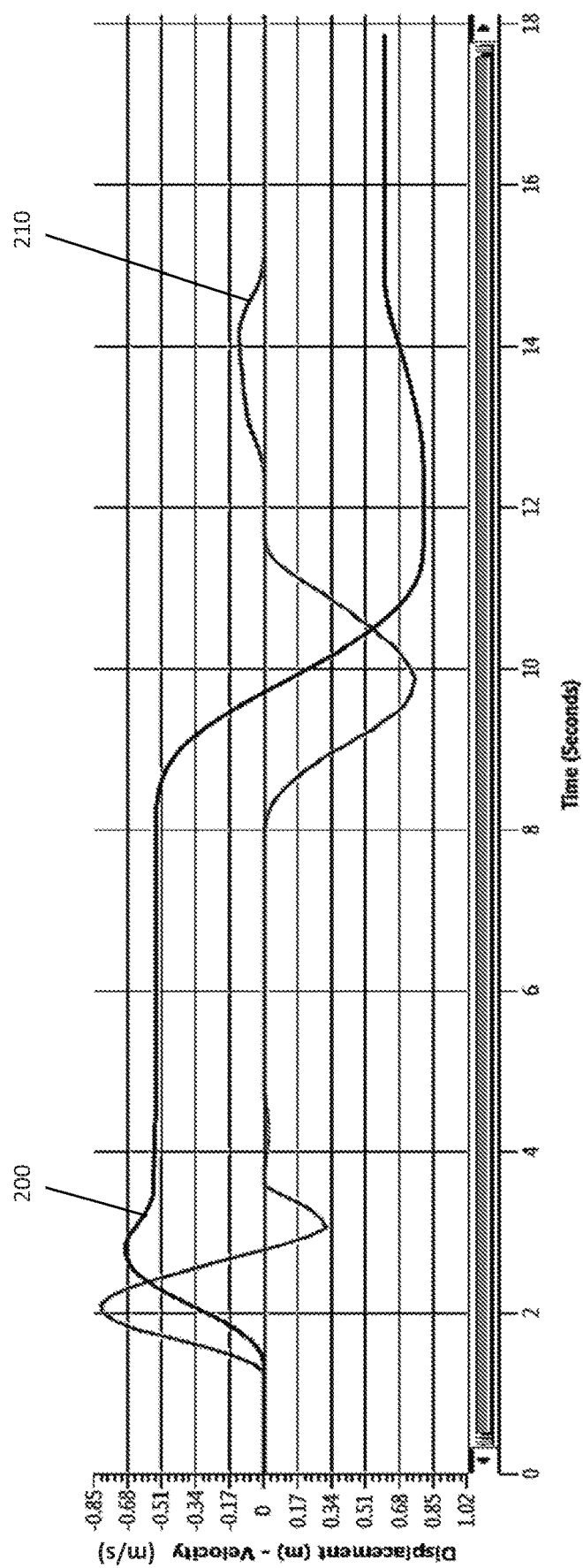
FIG. 5G is an example graph showing displacement and velocity of a movable carriage versus time for an example take-up device of the present disclosure that is used to tension a tail pulley of the same slope conveyor modeled in FIGS. 5A-5D.

FIG. 5G is an example graph showing movable carriage displacement and velocity versus time for an example take-up system of the present disclosure. Considering first a displacement trace 200, it can be seen that the movable carriage moves in a direction of a take-up pulley approximately in a time between the two and three-second marks. An amount of displacement is partly governed by a back-pressure developed in flow restrictors. By adjusting characteristics of the flow restrictors, a suitable balance may be achieved between injecting sufficient tension into the carry belt by developing sufficient back-pressure, preventing excessive outward movement of a piston rod, and limiting tension loads that must be carried by the take-up system. With respect to a velocity trace 210, it is apparent that the velocity leads the displacement of the movable carriage, as it must. The movable carriage velocity also changes from negative as the movable carriage is at first drawn towards a take-up pulley with the arrival of a tension wave via a return run of the conveyor belt, and then to positive as a pressurized fluid stored in an accumulator draws in the piston rod and thus takes up belt extension that manifests later in the power-loss event.

In yet another example shown in a side view in FIG. 6A and in a top view in FIG. 6B, an example trim winch 145 may be supported on the cart 142 that is interposed between the movable carriage 110 and the mounting frame 140 and/or various hydraulics components. The cart 142 may be supported for free longitudinal movement on wheels, sliding pads, or the like. In such an example, the hydraulic cylinder 130 may be supported by a frame 147 anchored to a fixed surface. Further, in some cases the trim winch 145 may be combined with a sheave-block and reeving arrangement 146. Consequently, the sheave-block and reeving arrangement 146 allows the trim winch 145 to be of a much lower tension rating. And because the trim winch 145 is used primarily for maintenance purposes, the sheave-block and reeving arrangement 146 does not affect normal operation of the take-up system 100. Furthermore, in examples where a sheave block is joined to a free end of the piston rod 132 and some form of support is needed for the weight the sheave block, a small movable support cart may be provided proximate to the moving sheave block.

Figure 7:
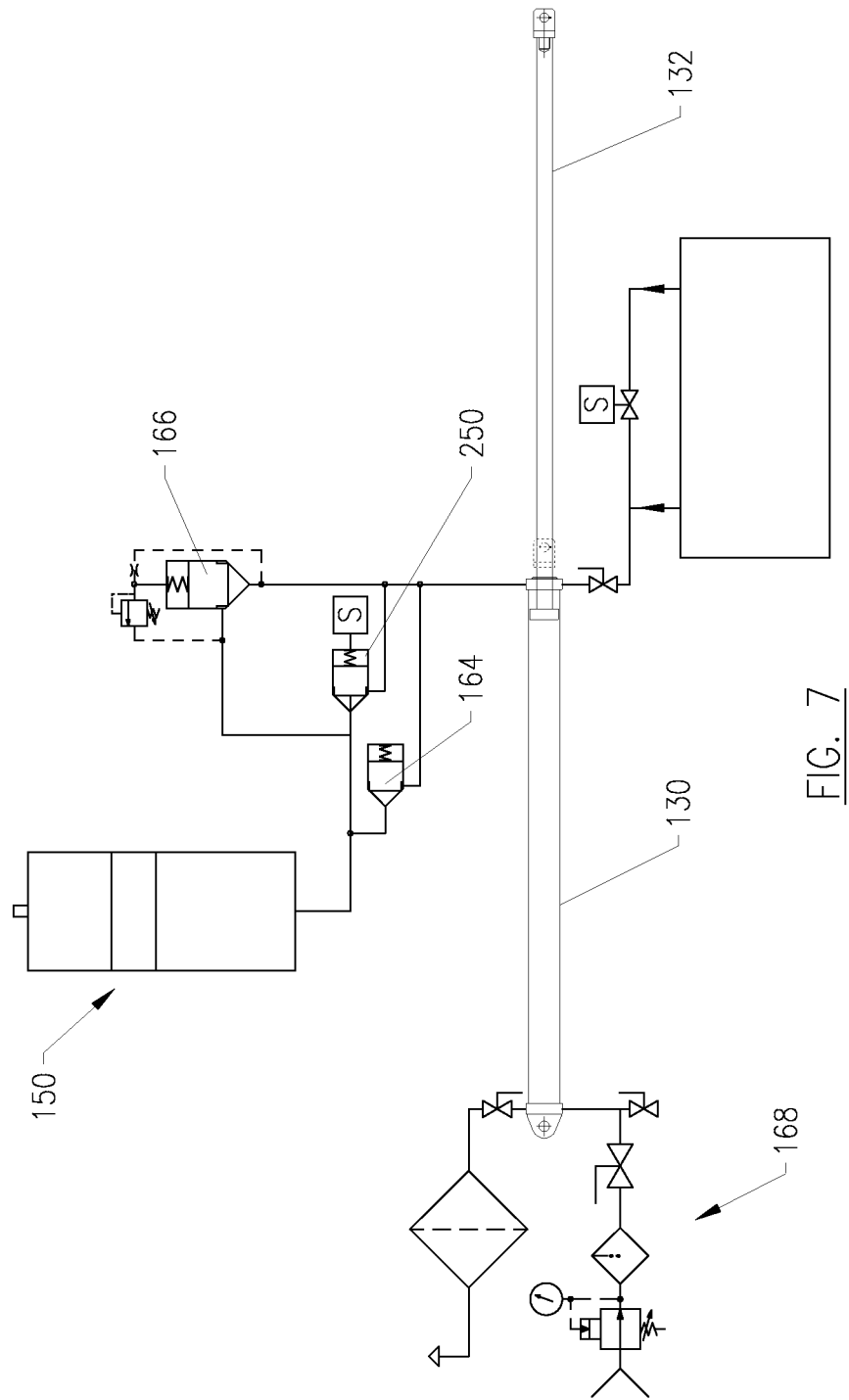
FIG. 7 is a schematic view of an example hydraulic circuit where a solenoid-controlled check valve prevents withdrawal of a piston rod for a predetermined period after a loss of power to a conveyor drive.

In some examples, such as that shown in FIG. 7, for instance, the flow restrictors 162 may be replaced by one or more check valves oriented to control flow from the hydraulic cylinder 130 towards the accumulator 150. In particular, resistance to high-speed oil flow out of a hydraulic cylinder 130 may be provided by a solenoid-controlled check valve 250 instead of partial flow restriction. Such check valves 250 may be configured to allow unrestricted flow in both directions during normal operation, but when the solenoid receives a signal that power to one or more conveyor drives has been lost the solenoid engages the check valve 250 for a pre-determined period. Hence, the restriction of flow from the hydraulic cylinder 130 towards the accumulator 150 is temporarily complete, so that the piston rod 132 is temporarily held in position and is prevented from being drawn out of the cylinder 130 because the check valve 250 prevents oil flow out of the cylinder 130. However, after the predetermined period when the initial high tension applied to the piston rod 132 has subsided, the one or more check valves 250 will allow pressurized fluid to flow from the accumulator 150 back into the cylinder 130, thus maintaining a minimum tension on the piston rod 132 and within a target range for the remainder of the transient event. Such an example flow restriction circuit may further include a sensing system to detect loss of power to the conveyor drives, as well as a release device that engages the check valves to check the flow as desired.

When a hydraulic circuit like that shown in FIG. 7 is used to tension the tail pulley of the same slope conveyor modeled in FIGS. 5E to 5G, the tension response may be similar to that shown in FIG. 5E, except that the peak tension may be similar to that which arises from an electric winch with a power-loss brake as illustrated in FIG. 5C. However, the sag response may be similar to that of FIG. 5F.

In still another example shown in a side view in FIG. 8 and in a top view in FIG. 9, the cart 142 disclosed in the prior examples that carries at least some of the hydraulics components may be incorporated into the movable carriage 110 supporting the take-up pulley 120. In such an embodiment, a free end of the piston rod 132 may be held in position by an example trim winch 148 anchored to a fixed base 149 at some distance to the rear of the movable carriage 110. While the example in FIGS. 8-9 shows two hydraulic cylinders 130 and two winch drums 148, it will be clear that similar arrangements with any number of hydraulic cylinders and winch drums may be employed.

Moreover, those having ordinary skill in the art would understand how in some cases the example take-up system 100 shown in FIGS. 8-9 could utilize a sheave-block and reeving arrangement, such as the sheave-block and reeving arrangement 146 shown in FIGS. 6A and 6B, for example. In such examples, a sheave block may be joined to the piston rod 132 or to the fixed base 149, for instance. And where the weight of the sheave block joined to the piston rod 132 would place an unacceptable load on elements of the hydraulic cylinder 130, the sheave block may be supported by a small cart that is free to move with the piston rod 132.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A tensioning system for a conveyor, the tensioning system comprising:
   a take-up pulley configured to maintain tension in a conveyor belt;
   a hydraulic cylinder that applies a force to the take-up pulley;
   an accumulator that supplies pressure to the hydraulic cylinder; and
   a flow restriction circuit that acts on fluid traveling from the hydraulic cylinder to the accumulator, wherein the flow restriction circuit is configured to increase a pressure in the hydraulic cylinder when a piston rod is drawn out of the hydraulic cylinder as a result of a tension wave in the conveyor belt, wherein the flow restriction circuit is configured to increase the pressure in the hydraulic cylinder to a level that is at least twice the pressure supplied solely by the accumulator under quasi-static conditions.

2. The tensioning system of claim 1 further comprising a movable carriage that supports the take-up pulley, wherein the hydraulic cylinder is connected to the movable carriage such that the hydraulic cylinder applies the force indirectly to the take-up pulley via the movable carriage.

3. The tensioning system of claim 1 further comprising a cart on which the hydraulic cylinder, the accumulator, and the flow restriction circuit are disposed, wherein the cart is selectively repositionable.

4. The tensioning system of claim 1 wherein the accumulator is a first accumulator, the tensioning system further comprising a second accumulator that is interconnected with the first accumulator, wherein the first and second accumulators supply pressure to the hydraulic cylinder concurrently.

5. The tensioning system of claim 1 comprising:
   a check valve disposed between the accumulator and the hydraulic cylinder, wherein the check valve permits flow only from the accumulator to the hydraulic cylinder; and
   a flow restrictor disposed between the accumulator and the hydraulic cylinder, wherein the flow restrictor is part of the flow restriction circuit and permits and controls flow from the hydraulic cylinder to the accumulator.

6. The tensioning system of claim 1 wherein the flow restriction circuit comprises a pressure-relief valve that regulates the pressure in the hydraulic cylinder.

7. The tensioning system of claim 1 further comprising an auxiliary circuit configured to add fluid to or remove fluid from either side of the hydraulic cylinder, or to add fluid to or remove fluid from the accumulator.

8. The tensioning system of claim 1 further comprising:
   a movable carriage that supports the take-up pulley, wherein the hydraulic cylinder is connected to the movable carriage such that the hydraulic cylinder applies the force indirectly to the take-up pulley via the movable carriage; and
   a cart that is selectively repositionable, wherein the hydraulic cylinder is disposed between the cart and the movable carriage.

9. The tensioning system of claim 1 further comprising:
   a cart on which the hydraulic cylinder is disposed; and
   a trim winch for repositioning the cart.

10. The tensioning system of claim 9 further comprising a sheave-block and reeving arrangement that is in communication with the trim winch and is disposed on at least one of the cart or a movable carriage that supports the take-up pulley.

11. The tensioning system of claim 1 further comprising:
    a movable carriage that supports the take-up pulley, wherein the hydraulic cylinder is connected to the movable carriage such that the hydraulic cylinder applies the force indirectly to the take-up pulley via the movable carriage; and
    a trim winch that is secured to a fixed base and connected to the piston rod of the hydraulic cylinder, the trim winch configured to move the hydraulic cylinder and the movable carriage with the take-up pulley,
    wherein the hydraulic cylinder applies the force indirectly to the take-up pulley via the movable carriage when the conveyor is in operation, wherein the trim winch is configured to move the hydraulic cylinder and the movable carriage when the conveyor is out of operation.

12. The tensioning system of claim 11 wherein the accumulator and the flow restriction circuit are disposed on the movable carriage.

13. A tensioning system for a conveyor, the tensioning system comprising:
    a take-up pulley configured to maintain tension in an endless belt of the conveyor, wherein the take-up pulley moves as an effective length of the endless belt changes in response to a dynamic disturbance of tension distribution along a length of the endless belt;
    a movable carriage that supports the take-up pulley;
    a hydraulic cylinder that applies a force indirectly to the take-up pulley via the movable carriage;
    an accumulator that supplies a quasi-static pressure to the hydraulic cylinder; and
    a flow restrictor that acts on fluid traveling between the hydraulic cylinder and the accumulator, wherein the flow restrictor is configured to increase a pressure in the hydraulic cylinder when a piston rod is drawn out of the hydraulic cylinder as a result of the dynamic disturbance in the tension distribution along the length of the endless belt, wherein the flow restrictor increases the pressure in the hydraulic cylinder to a level that is at least twice the quasi-static pressure supplied to the hydraulic cylinder by the accumulator.

14. The tensioning system of claim 13 further comprising a mounting frame that is connected to the hydraulic cylinder and at least partially supports the hydraulic cylinder.

15. A tensioning system for a conveyor, the tensioning system comprising:
    a take-up pulley configured to maintain tension in a conveyor belt;
    a hydraulic cylinder that applies a force to the take-up pulley;
    an accumulator that supplies pressure to the hydraulic cylinder; and
    a check valve that controls a flow of fluid traveling between the hydraulic cylinder and the accumulator, wherein during normal operation of the conveyor the check valve permits unrestricted flow in both directions, wherein in response to a loss of power to the conveyor the check valve shuts off flow from the hydraulic cylinder towards the accumulator in a first time period so that a piston rod of the hydraulic cylinder is prevented from being drawn out or drawn out any further from the hydraulic cylinder.

16. The tensioning system of claim 15 wherein in a second time period following the first time period, the check valve permits fluid to flow between the accumulator and the hydraulic cylinder so as to maintain at least some tension on the piston rod until dynamic tension disturbances caused by the loss of power dissipate.

17. The tensioning system of claim 15 wherein the first time period is a predetermined period, wherein shutting off flow through the check valve prevents the piston rod from being drawn out or drawn out any further from the hydraulic cylinder during the predetermined period.

18. The tensioning system of claim 15 comprising:
   a sensing system for detecting a loss of power to the conveyor; and
   a release device that engages the check valve to check the flow of fluid.

19. The tensioning system of claim 15 wherein the check valve is a solenoid-controlled check valve.

20. A tensioning system for a conveyor, the tensioning system comprising:
   a take-up pulley configured to maintain tension in a conveyor belt;
   a hydraulic cylinder that applies a force to the take-up pulley;
   an accumulator that supplies pressure to the hydraulic cylinder;
   a flow restriction circuit that acts on fluid traveling from the hydraulic cylinder to the accumulator, wherein the flow restriction circuit is configured to increase a pressure in the hydraulic cylinder when a piston rod is drawn out of the hydraulic cylinder as a result of a tension wave in the conveyor belt; and
   a flow line that permits fluid to flow unrestricted from the accumulator to the hydraulic cylinder so as to maintain the pressure in the hydraulic cylinder at a quasi-static pressure supplied by the accumulator.

\* \* \* \* \*